United States Patent [19]

Chi

[11] Patent Number: 5,445,047
[45] Date of Patent: Aug. 29, 1995

[54] HANGER MEANS FOR A WHEELED VEHICLE

[76] Inventor: Yi C. Chi, No. 139-5, An Mei Rd., Mei Shan Village, Hou Li Hsiang, Taichung Hsien, Taiwan

[21] Appl. No.: 158,528

[22] Filed: Nov. 29, 1993

[51] Int. Cl.$^6$ .............................................. B62K 21/12
[52] U.S. Cl. ........................... 74/551.1; 74/551.3; 280/278; 280/279; 403/131; 403/344; 384/537
[58] Field of Search ................. 74/551.1–551.8; 280/278, 279, 280, 287; 403/131, 344; 384/537, 546

[56] References Cited

U.S. PATENT DOCUMENTS

| 4,611,818 | 9/1986 | Cammarata | 280/278 |
| 4,767,130 | 8/1988 | Fu-Chao | 280/278 X |
| 5,133,224 | 7/1992 | Prins | 74/551.3 |
| 5,193,930 | 3/1993 | Chi | 403/344 X |
| 5,291,797 | 3/1994 | Chi | 280/279 X |
| 5,319,993 | 6/1994 | Chiang | 74/551.1 |
| 5,331,864 | 7/1994 | Chi | 74/551.1 |
| 5,337,609 | 8/1994 | Hsu | 74/551.3 |

FOREIGN PATENT DOCUMENTS 0172979  3/1986  European Pat. Off. .......... 74/551.1

*Primary Examiner*—Vinh T. Luong
*Attorney, Agent, or Firm*—Hedman, Gibson & Costigan

[57] ABSTRACT

A hanger means for a wheeled vehicle comprises a fastening member which is adapted to be securely mounted above a head set of a wheeled vehicle, and a hanger which has first and second ends, a brake cable passes through the first end of the hanger and the second end of the hanger is pivoted to the fastening member allowing the hanger to be pivotable between a locked lower position and an unlocked upper position where said head set is accessible.

2 Claims, 3 Drawing Sheets

HANGER MEANS FOR A WHEELED VEHICLE

BACKGROUND OF THE INVENTION

The present invention relates to a hanger pivoted to a fastening member which, in turn, is mounted above a head set of a wheeled vehicle.

The conventional hanger of a wheeled vehicle is a curved element having first and second ends. The first end has a cylindrical part having a through hole therein for extending a brake cable and the second end thereof is formed integrally with a ring element which is engaged on a steerer tube. A head set is engaged below the ring element on the steerer tube of the wheeled vehicle. Such an arrangement causes some drawbacks, one of which is when maintaining the head set a tool cannot reach the head set because of the fixed hanger obstructing access thereto.

The present invention intends to provide an adjustable hanger to mitigate and/or obviate the above mentioned problems.

SUMMARY OF THE INVENTION

A hanger means for a wheeled vehicle comprises a fastening member which is adapted to be securely mounted above a head set of a wheeled vehicle, and a hanger which has first and second ends, a brake cable passes through the first end of the hanger and the second end of the hanger is pivoted to the fastening member allowing the hanger to be swung up after removed of a brake cable whereby said head set is accessible.

The objects, advantages, and novel features of the invention will become more apparent from the following detailed description when taken in conjunction with the accompanying drawings.

DETAILED DESCRIPTION OF THE PREFERRED EMBODIMENT

Figure 1:
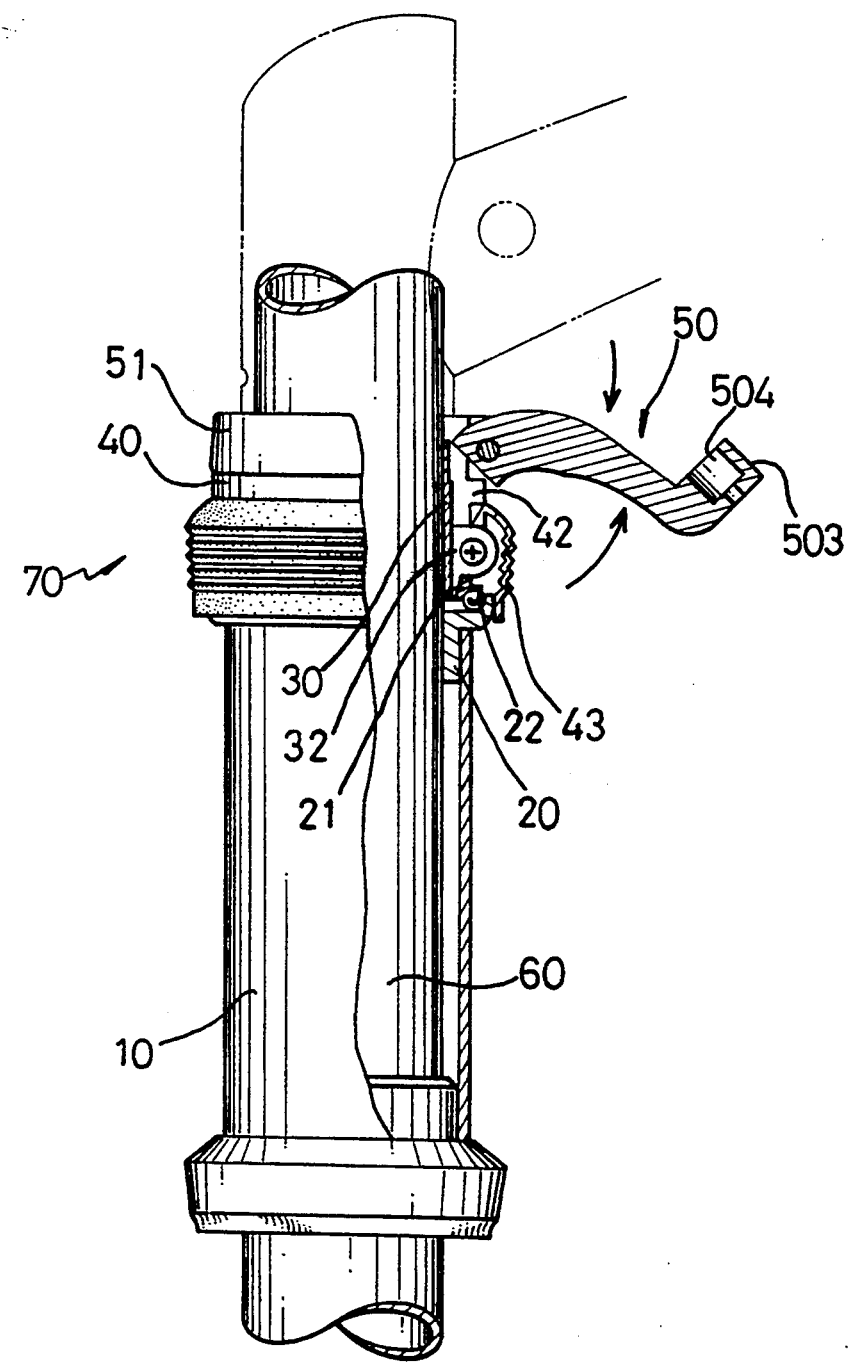
FIG. 1 is a side elevational view, partly in section, of a hanger means showing the hanger swung above the head set engaged on the steerer tube in accordance with the present invention.
Figure 2:
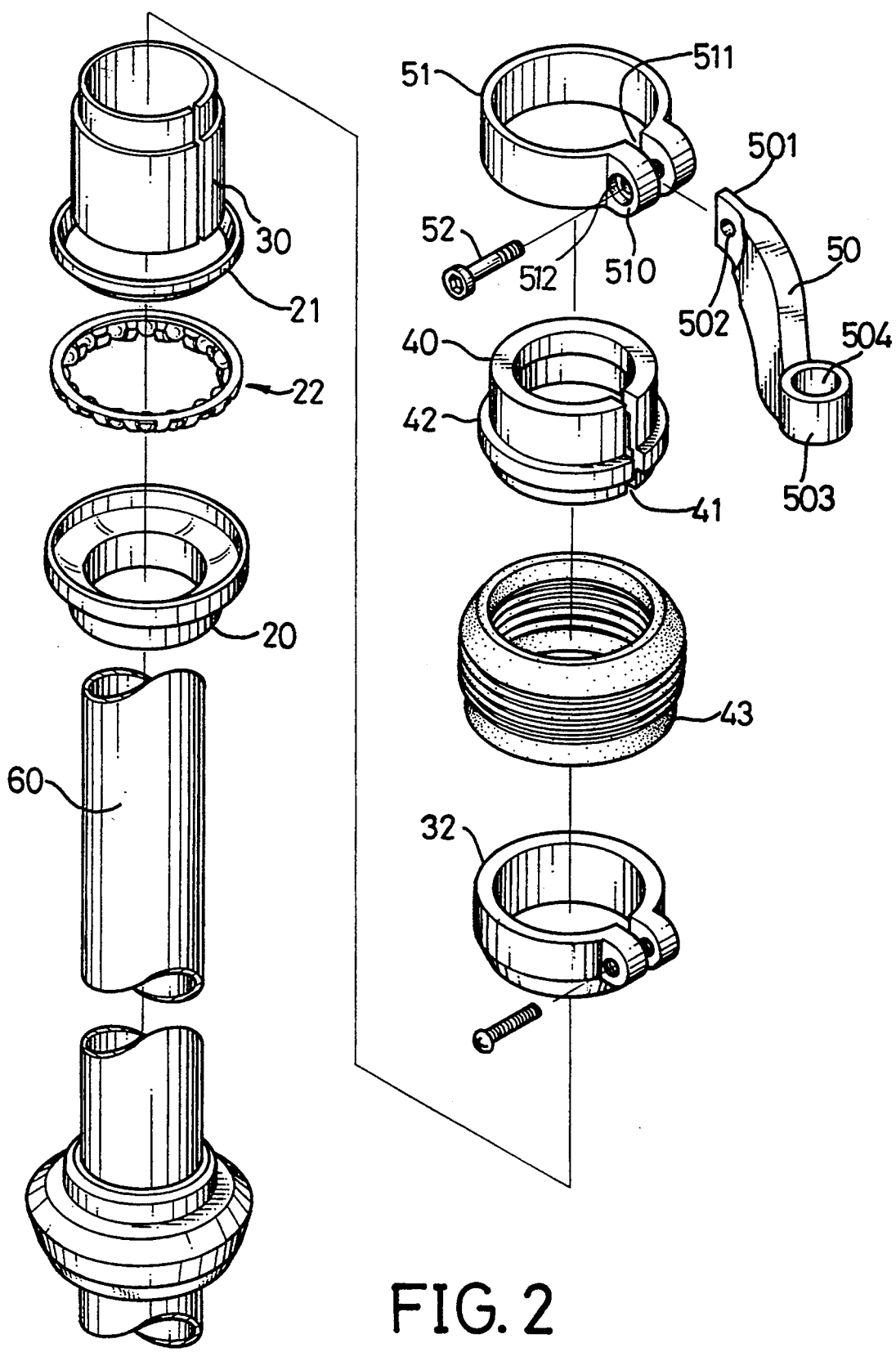
FIG. 2 is an exploded view of the steerer tube, head set and hanger in accordance with the present invention.
Figure 3:
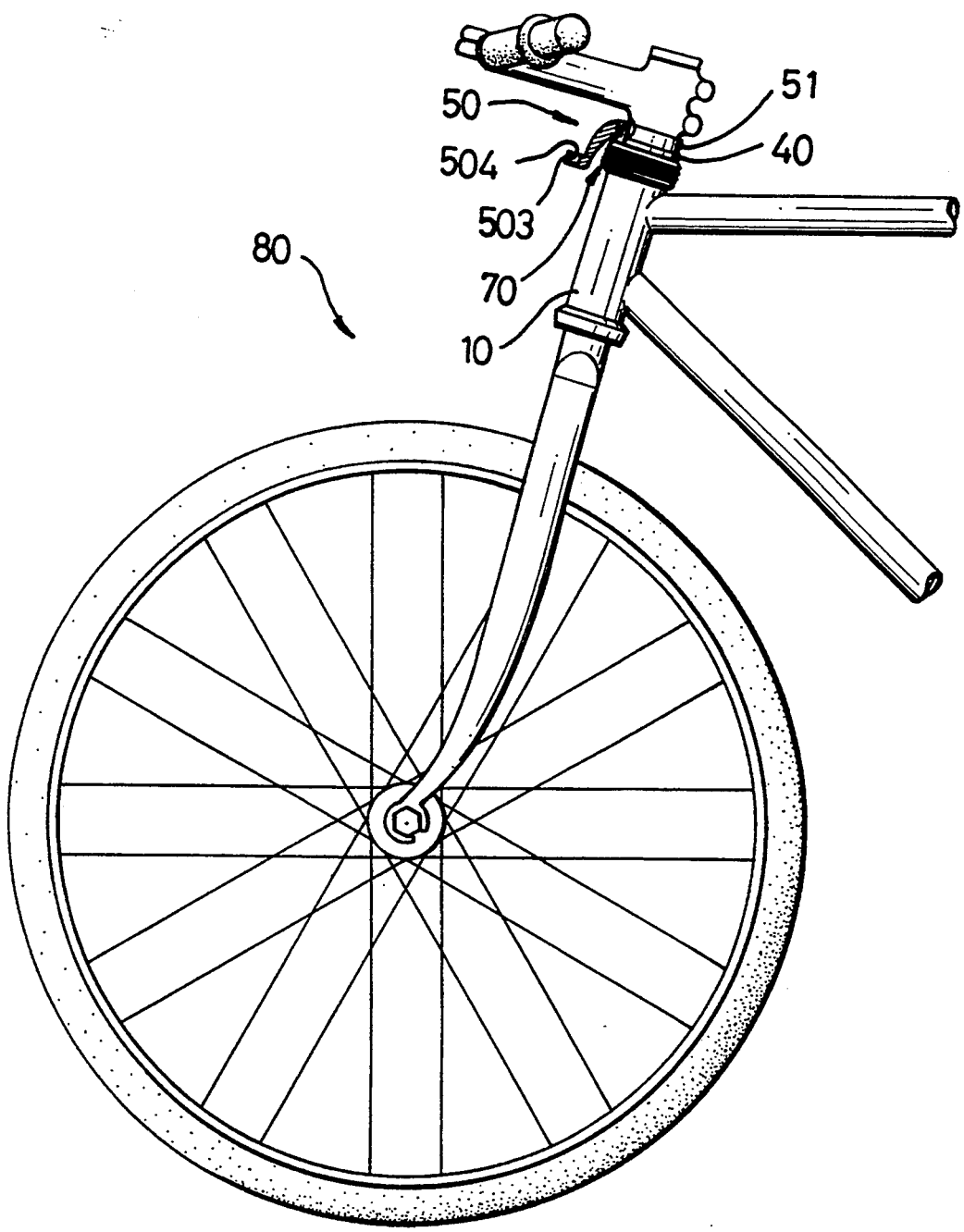
FIG. 3 is a side elevational view, partly in section, of a hanger means engaged on the steerer tube of a wheeled vehicle in accordance with the present invention.

Referring to the drawings, a hanger 50 in accordance with the present invention is pivotably mounted on a fastening member 51 above a head set 70 which is rotatably engaged between a steerer tube 60 and a head tube 10 of a wheeled vehicle 80. The hanger 50 has first and second ends, the first end having a cylindrical part 503 having a through hole 504 therein through which a brake cable (not shown) passes, the second end 501 being flat and in which a hole 502 is formed. The fastening member 51 is a C-shaped member having two opposed peripheral edges, defining a gap 511 therebetween, a lug 510, having an engaging hole 511 defined therein, extends radially and outwardly from each peripheral edge. The second end 501 of the hanger 50 is pivotably mounted between the lugs 510 by a bolt passing through the engaging holes 511 and the hole 502.

In the embodiment of tile present invention, the fastening member 51 is mounted above head set 70 of the type comprising a first sleeve 40, a rubber bellow 43, a fastening ring 32, a second sleeve 30, a ring element 21, a bearing set 22 and a race 20, the sleeve 40 is a C-shaped member which has two peripheral edges, defining a slit 41 therebetween, and an annular flange 42 which is formed radially extending outwardly therefrom. The fastening member 51 is tightly mounted on the first sleeve 40 with a bottom portion of the fastening member 51 abutting an upper portion of the annular flange 42, by which the fastening member 51 is tightly mounted on the first sleeve 40 engaged on the steerer tube 60 of the wheeled vehicle 80. The hanger 50 can be swung up with respect to the bolt 52, such that a tool has convenient access to the head set 70 (best shown in FIG. 1).

Although the invention has been explained in relation to its preferred embodiment, it is to be understood that many other possible modifications and variations, such as the fastening member 51 can be mounted on other types of head set, or be engaged on the steerer tube or the head tube directly, can be made without departing from the spirit and scope of the invention as hereinafter claim.

I claim:

1. A hanger means for a wheeled vehicle having a head set disposed thereto, and comprising a fastening member and a hanger, said fastening member adapted to be securely mounted above said head set of said wheel vehicle, said fastening member being a C-shaped member having two opposed peripheral edges, a lug, with an engaging hole defined therein, extending radially and outwardly from each of said peripheral edges; and said hanger having first and second ends, said first end thereof having a through hole defined therein, said second end thereof having a hole defined therein and pivotally engaged between said lugs of said fastening member by extending a bolt through said hole and said engaging holes of said lugs such that said hanger is able to be swung up for a convenience of accessing said head set.

2. The hanger means as claimed in claim 1 wherein said first end of said hanger has a cylindrical part formed thereon having a through hole defined therein.

* * * * *